United States Patent [19]

Das

[11] Patent Number: 4,879,640

[45] Date of Patent: Nov. 7, 1989

[54] ROM DRIVEN PWM INVERTER

[76] Inventor: Pawan K. Das, 101 Kent Ave., Marlton, N.J. 08053

[21] Appl. No.: 203,917

[22] Filed: Jun. 8, 1988

[51] Int. Cl.⁴ .................................. H02M 7/5387
[52] U.S. Cl. .................................. 363/41; 363/132
[58] Field of Search .................. 363/41, 42, 132

[56] References Cited

U.S. PATENT DOCUMENTS

| 3,614,590 | 10/1971 | Kernick | 363/42 |
| 4,513,362 | 4/1985 | Aizawa | 363/41 |
| 4,758,941 | 7/1988 | Felton et al. | 363/132 |

FOREIGN PATENT DOCUMENTS

| 31377 | 2/1982 | Japan | 363/41 |
| 112471 | 7/1983 | Japan | 363/41 |
| 133174 | 8/1983 | Japan | 363/41 |
| 2078 | 1/1985 | Japan | 363/41 |
| 113667 | 6/1985 | Japan | 363/41 |

Primary Examiner—William H. Beha, Jr.
Attorney, Agent, or Firm—Donald C. Simpson

[57] ABSTRACT

A highly innovative new technique of developing DC to AC power sources for various applications has been described. Such technique of generating AC power is different from the conventional techniques and this new technology has been called the Solid State Power Supply (SSPS) Technology. The principle of operation depends upon high frequency switching using MOSFET bridge inverter which utilizes charge-discharge averaging principle to generate the sinusoidal AC voltage. The use of fast turn-on power MOSFETs enables the application of high frequency switching on this power technology. While the non-isolated SSPS is claimed to be transformerless, the isolated SSPS requires the use of a high frequency transformer for input-output isolation and for changing the output voltage level. The output filtering is reduced tremendously, thereby reducing the size of such power supplies. The SSPS technology is expected to revolutionize the DC to AC power conversion technology and a compactness as much as 4:1 over the current 50 KHz switching inverter is possible.

7 Claims, 3 Drawing Sheets

ROM DRIVEN PWM INVERTER

1. "Solid State AC/DC, DC/DC & DC/AC Power Supplies", Disclosure Document No. 151851, filed June 12, 1986 by Pawan K. Das and stamped June 16, 1986 by the U.S. Patent Office.

2. "AC to DC Solid State Power Supply", filed June 6, 1988 by Pawan K. Das.

3. "DC to DC Solid State Power Supply", filed June 6, 1988 by Pawan K. Das.

While the disclosure document, item 1, relates to AC to DC, DC to DC and DC to AC power supplies, three patent applications filed separately, as stated above in items 2 and 3 and this very application, contain information that were included in the said disclosure document. Additional details, as developed later, are included as well.

BACKGROUND OF THE INVENTION

Power supply technology has been in existence since the beginning of the electronic world. Certain electronic circuits and certain electrical load need be powered from a reliable AC source and such power source must be generated from a reliable source of DC power. Currently there exists switching inversion technology to generate AC power from a given source of DC power.

The DC to AC inverter first inverts the DC voltage to AC squarewave voltage and adequate filtering is then used to generate sinusoidal AC voltage. Other methods employ pulse-width modulation to generate the sinusoidal voltage. The current technology uses transformer, inductor and capacitor invariably and on account of the odd shapes of such components, certain compact packaging is not possible. It is difficult to make small cubic modules of power supplies of small to medium power ratings. It is difficult to make small hybrid power modules with DC input and AC output, which can be installed directly on a printed circuit card or outside and deliver up to 100 watts of power. It is high desirable that the power supply technology be revolutionized further and the new technology developed should ensure the birth of these products.

SUMMARY OF THE INVENTION

Several new innovations in semiconductor microminiaturization and related program have reduced the size of electronic and electromechanical products to very compact size, whereas the size of the power sources that energize such products, has stayed the same. This requires the development of new power sources and power distribution networks of various catagories. Such power products, once reduced to a compact size, shall find a wide application in several electronic and electromechanical products.

The primary elements of the DC to AC switching power supply are: (a) auxiliary power supply, (b) input switching circuit, (c) isolating transformer, (d) control circuit, (e) magnetic circuit, (f) output filter, (g) heat distribution element and (h) packaging components. Most switching power supplies operate at a switching frequency of 50 KHz to 200 KHz. In that range, the size of the transformer and filter reduces considerably. The use of higher power MOSFETs, in place of transistors, has although made such power supplies smaller, there exists some additional means, the importance of which has not so far been realized. Here are some of the methods which must be given a due consideration:

(a) Employ very high frequency switching, as high as 1 MHz, due to added advantage of reducing the size of the magnetic and filtering circuits.

(b) Devise means of reducing filtering at the output level withoug losing voltage regulation.

(c) Develop circuits that eliminate totally the use of transformer; alternately, reduce further the size of the transformer/inductor by utilizing special type of ferrite material which exhibits a low loss at such a high switching frequency.

(d) Employ charge-discharge output voltage control mechanisms, which shall be compatible with the high frequency switching.

(e) Conduct advanced research to devise new series of high density semiconductor devices for this application.

(f) Utilize better quality of heat sink and heat transfer mechanism that will reduce the volume of the power converter.

There is described herein, with reference to the accompanying drawings, a new method of DC to AC power conversion. This requires high frequency MOSFET bridge inversion incorporating charge-discharge switching. A high frequency switching followed by sinusoidal averaging technique generates a clean sine wave output after desired filtering. It is this method of full-wave bridge inversion which was not applied before using MOSFETs as the switching elements. A high frequency transformer between the input switching MOSFETs and the output filter makes this circuit an isolated SSPS, whereas the absence of such transformer makes this a non-isolated SSPS. The non-isolated SSPS may be useful for small electronic products where the isolation from the input power is not desirable and the isolated SSPS shall be useful in several applications with large systems and systems with multiple interfacing.

Power supplies developed through SSPS Technology shall have numerous advantages over currently available switching power supplies. Some advantages are greater power density, light filtering, high MTBF, light weight and certain other advantages. The inventor has already performed analysis of the DC/AC SSPS and conducted experiment with an AC/DC SSPS using existing components. Most of the benefits have been observed to be valid. It is good to note that the SSPS technology offers a series of advantages over the linear and switching power supply technology.

BRIEF DESCRIPTION OF THE DRAWINGS

The invention will become more readily apparent by studying the accompanying drawings, a brief description of which is given below.

DESCRIPTION OF THE PREFERRED EMBODIMENT

Figure 1:
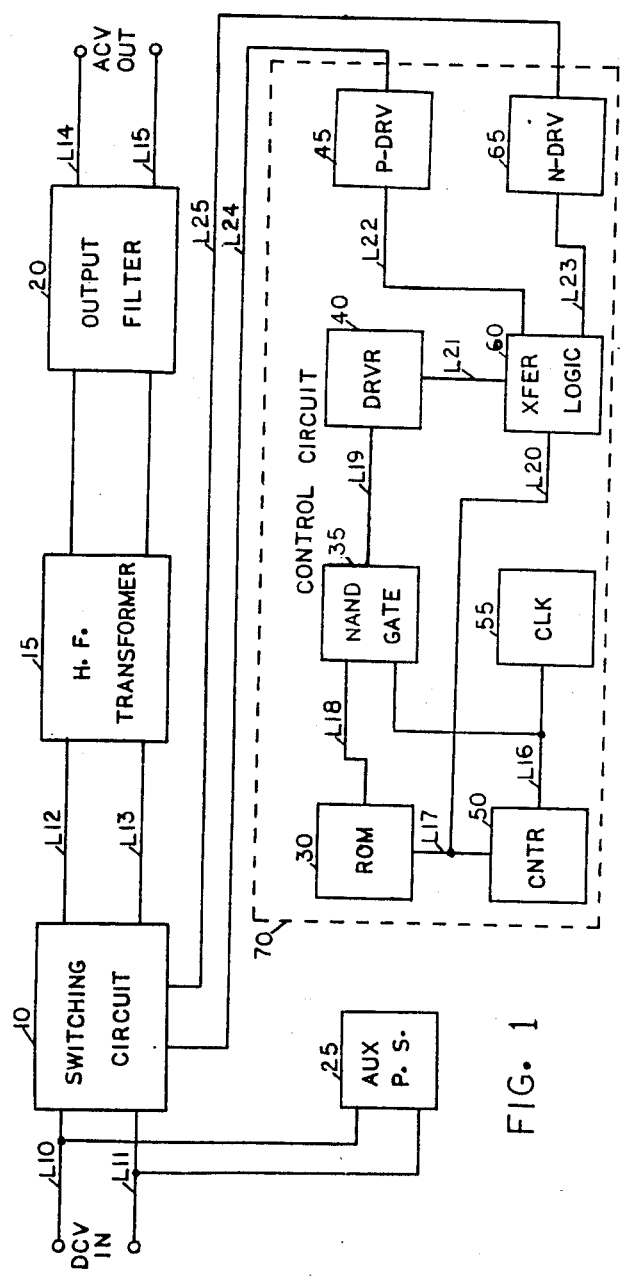
FIG. 1 is the basic block diagram of the DC to AC isolated full-wave bridge inverted solid state power supply. This shows the interconnection of the major components and details of the control circuit.

There is illustrated in FIG. 1 the block diagram of the isolated DC/AC SSPS. While FIG. 2 includes a detailed schematic of this inverter, FIG. 3 contains the timing diagram of this product. Power inverter of the isolated versus non-isolated type are covered in detail in the next sub-sections.

The preferred embodiment contains detailed description of the following sub-sections:
1. General Description of the DC/AC SSPS
2. Detailed Description of the DC/AC SSPS, and
3. Memory Switching Algorithm for DC/AC SSPS All these sub-sections are catagorically described now.

General Description of the DC/AC SSPS

This sub-section described the block diagram of FIG. 1. Here DC input voltage DCV IN is fed through lines L10 and L11 to the input of the switching circuit block 10. The output of this block is delivered over lines L12 and L13, which are connected to the input of the h-f transformer block 15. In the same way the output of the h-f transformer block 15 is connected to the input of the output filter block 20. The output of the output filter block delivers the AC voltage ACV OUT over lines L4 and L15. The auxiliary power supply block 25 receives DC input over lines L10 and L11 from the primary DC input and provides auxiliary DC voltage to drive the control circuit.

The control circuit is denoted by block 70 which is enclosed by dashed lines. This block consists of eight different blocks which will be described now. The clock circuit is in block 55 which delivers high frequency clock to the counter block 50 and the NAND gate block 35. The output of the counter over line L17 goes to address the ROM 30 and the transfer logic 60 over line L20. Signal over L20 is the most significant bit. ROM 30 sends the data output over line L18 to the NAND gate 35. This modulates the data with the h-f clock and generates clocked data pattern over line L19. This is delivered to the driver 40. The driver output is delivered over line L21 to the transfer logic 60. This has two outputs. The driver output over line L21 is delivered over lines L22 and L23 to P-DRV block 45 and N-DRV block 65. This happens in accordance with the polarity of the counter 50 output over line L20. The output of the P-DRV and N-DRV blocks over lines L24 and L25 are connected to the switching circuit block 10. This is used to control the positive and negative polarity of the sinusoidal voltage.

Detailed Description of the DC/AC SSPS

Figure 2:
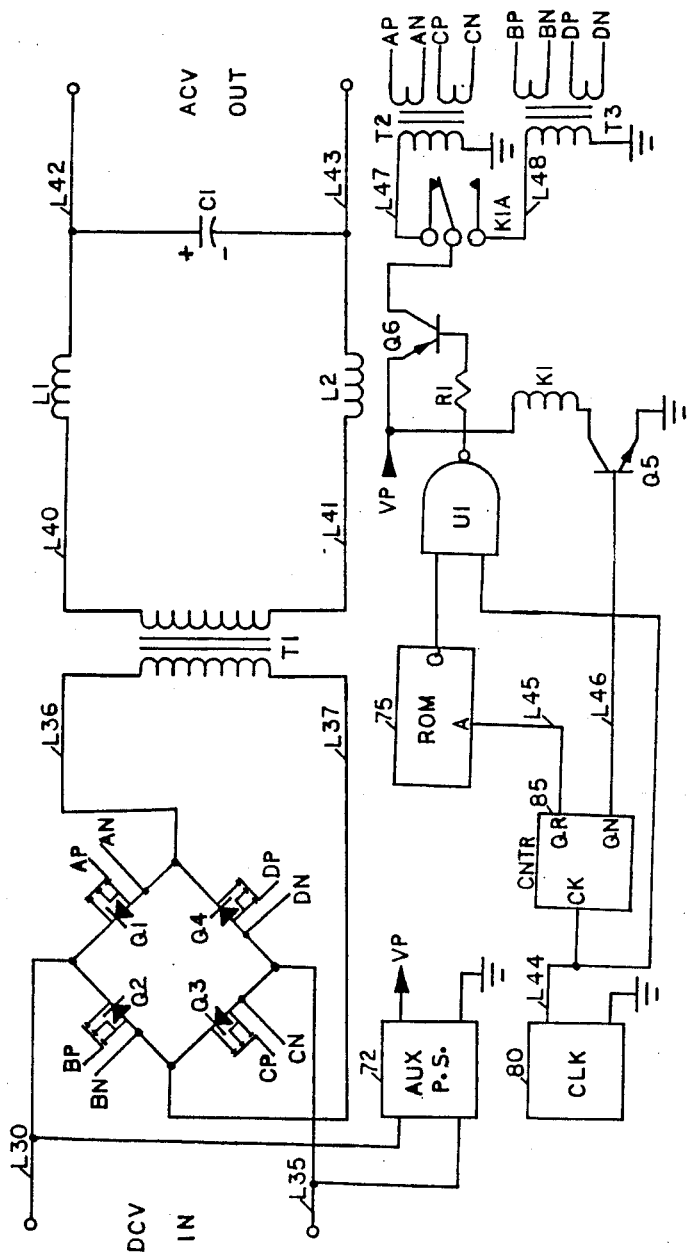
FIG. 2 is the schematic of the full-wave bridge inverted DC to AC isolated solid state power supply. This includes greater circuit level details of the block diagram of FIG. 1.

The detailed schematic of the DC/AC SSPS is illustrated in FIG. 2. The detailed description follows from the explanation of this schematic. Referring to FIG. 2, the switching circuit is comprised of four MOSFETSs Q1, Q2, Q3 and Q4, all connected in such a way as to form a bridge inverter circuit. Thus if Q1 and Q3 are on, current flows from the upper limb L36 to the lower limb L37 of the input side of the transformer T1. With Q2 and Q4 on, the current flows in the reversed direction. This makes the circuit a true inverter. The transformer serves as an isolation and voltage changing element. The voltage at L40-L41 may thus be different from the voltage at the primary side L36-L37 of the transformer. The waveshape of this voltage will look like the pulsed wave of part ACO of FIG. 3. Inductors L1 and L2 and capacitor C1 serve as the output filter circuit. The filtered voltage appears as the sinusoidal wave of part ACO of FIG. 3.

The auxiliary power supply is shown in block-form by block 72. This may constitute from a linear voltage regulator or a micro-switching regulator. The output voltage VP of this power supply is used to feed the entire control circuit.

The control circuit starts as block 80 as the clock generator block designated CLK. Here high frequency clock appearing at L44 is used to clock the counter 85. The h-f clock goes to one input of the NAND gate U1 also. The N-bit counter uses (N-1) bits to address ROM 75 over bunch of lines L45. For reliable operation, ROM addressing may be of as low as 6-bits to as high as 12-bits in length. Here an 8-bit counter with 128-bit deep ROM is suggested. The most significant bit QN of the counter is used to trigger the transistor Q5 which drives a relay to flip positive and negative cycles of the AC sinusoidal wave. The output of the ROM is programmed in such a way that too many bits appear near the peak value of the sinusoid and not too many bits appear near the lower value of the sinusoid of the AC wave. The output of the NAND U1 thus drives a transistor which with a relay contact transfer mechanism, turns on transformer T2 or T3. The relay mechanism has been shown here for simplicity. In practice, analog switches may be used as well. For this, the analog switch contacts will have to be connected towards the base of the transistor Q6 and the collector directly to the transformer T2. A second transistor will thus be required in the negative side to connect to transistor T3. The analog switch control may be driven directly from output QN of the counter 85 and thus, no transistor Q5 will be required here. Outputs AP-AN and CP-CN connect to MOSFETs Q1 and Q3 and outputs BP-BN and DP-DN connect to MOSFETs Q2 and Q4.

Figure 3:
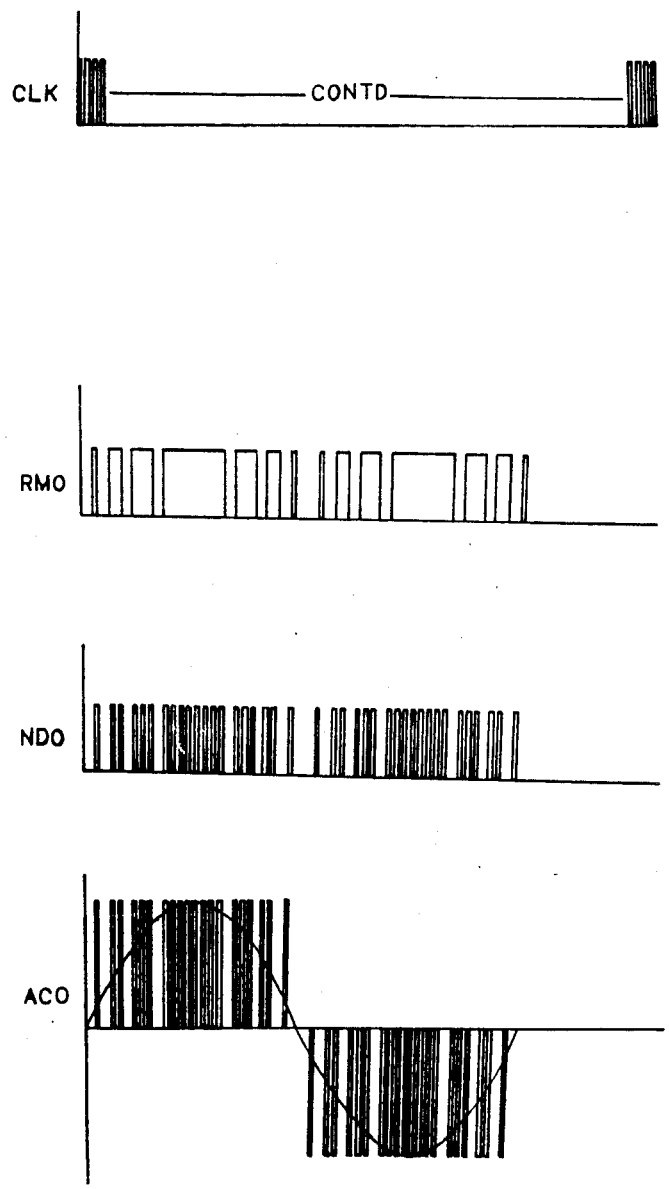
FIG. 3 is the timing diagram of the control signals and the output voltage of the full-wave bridge inverted to DC to AC SSPS.

FIG. 3 illustrates a typical timing diagram of the DC/AC SSPS. Signal CLK in this diagram is the clock and RMO a typical ROM output. PROM, UVPROM or EEPROM may be used as well in place of the ROM. The NAND gate output is shown by curve NDO. Here each pulse of curve RMO is NANDed with the clock and the clocked output is generated. When this clocked output at NDO is used to drive transistor Q6 and transformer T2, the positive pulse and positive sinusoidal wave is generated at curve ACO. Similarly, after bit QN of the counter is flipped, the relay flips, which connects T3 through normally open contact of K1A to the collector of transistor Q6 and this generates the negative pulse and negative sinusoidal wave of curve ACO. Here the peak value of the sinusoidal wave is not equal to what it should be. Only a proportional waveshape is shown for clarity.

The isolated full-wave bridge inverted DC/AC solid state power supply uses a h-f transformer to isolate the input and output sides. Such power supply without the use of transformer is also possible. Such power supply is called non-isolated full-wave bridge inverted DC/AC SSPS. The non-isolated DC/AC SSPS will provide only one fixed AC voltage which will depend entirely upon the DC input voltage. This is because the lack of transformer limits the scope of stepping-up or stepping-down the switched input DC voltage to generate the desired AC output. The non-isolated DC/AC SSPS may thus have very limited application.

Memory Switching Algorithm for DC/AC SSPS

It was stated earlier that the memory ROM contains bits which are NANDed with the clock to generate clocked bits, which in turn, are used to generate the sinusoidal pulses. These ROM bits are densely populated near the peak value of the sinusoidal wave. The following equation gives a relationship to compute one's and zero's for the ROM:

$$a = n \sin\{(2r-1)\pi/2N\},$$

where
- N = Number of segments in a half cycle,
- n = Number of sub-segments in a segment,
- a = Number of sub-segments with one's in the ROM.
- r = Segment number under consideration,
- n.N = Number of bits in the ROM, and
- (n−a) = Number of sub-segments with zero's in the ROM.

This formula has been developed with the understanding that one's and zero's in a segment average out to equal the sinusoidal value of the waveshape at the middle of the segment. For more uniform averaged sine wave both N and n should be large number.

I claim:

1. A device for generating AC power from a DC source supplying an input voltage, comprising:
   input means for inputting the input voltage from the DC source;
   output means for outputting a device output voltage from said device;
   switching circuit means for automatically switching the input voltage;
   high frequency transformer means for isolating said input means from said output means, for stepping-up or stepping-down the input voltage and for outputting a transformer output voltage;
   output filter means for filtering the transformer output voltage to a desired AC output voltage level;
   control circuit means for controlling the switching circuit means, comprising:
     read only memory means, having an output, for storing switching control data;
     means for repeatedly turning on and off said switching circuit means based upon the switching control data; and
     NAND gate means for modulating the output of said read only memory means; and
   auxiliary power supply means for generating auxiliary DC power from the DC source to supply power to said control circuit means.

2. The device according to claim 1 wherein said switching circuit means comprises a bridge converter circuit having four limbs, each limb including a MOSFET, all of said MOSFETs being identical and separately powered, so that a square wave voltage is generated when a first pair of said MOSFETs of opposite limbs are turned on at the same time, while a second pair of MOSFETs of opposite limbs remain off, and the operation is reversed if the second pair of MOSFETs are turned on.

3. The device according to claim 1 wherein the transfer logic means comprises a form-C relay having an arm connected to the driver means and having normally open and normally closed contacts connected to the negative and positive drive means respectively.

4. The device according to claim 3 wherein said driver means includes a transistor having a base connected to the output of the NAND gate means through a series resistor and having a collector connected to the arm of the form-C relay of the transfer logic means.

5. A device for generating AC power from a DC source suplying an input voltage, comprising:
   input means for inputting the input voltage from the DC source;
   output means for outputting a device output voltage from said device;
   switching circuit means for automatically switching the input voltage;
   high frequency transformer means for isolating said input means from said output means, for stepping-up or stepping-down the input voltage and for outputting a transformer output voltage;
   output filter means for filtering the transformer output voltage to a desired AC output voltage level;
   control circuit means, comprising:
     clock means for outputting a high frequency clocking signal;
     counter means for providing (N−1) lower significant bits to address said read only memory means and for providing a most significant bit;
     read only memory means, having an output for storing switching control data according to a memory algorithm and for outputting such data;
     NAND gate means, having an output, for modulating the output of said read only memory means with the clocking signal and for generating a clocked input signal;
     driver means for receiving the clocked output signal from the NAND gate means and for generating a drive signal;
     transfer logic means for receiving the most significant bit and for generating positive and negative drive signals;
     positive drive means for receiving the positive drive signals and for generating positive pulse control for said switching circuit means; and
     negative drive means for receiving the negative drive signals and for generating negative pulse control for said switching circuit means; and
   auxiliary power supply means for generating auxiliary DC power from the DC source to supply power to said control circuit means.

6. The device according to claims 1 or 5 wherein the AC power generated by the device is a sinusoidal wave and wherein said read only memory means stores bit patterns so that in a segment of the sinusoidal wave, one's and zero's bits average out to produce an instantaneous sinusoidal value at a mid-point of the segment, the bit patterns being generated according to a derived memory algorithm.

7. A device for generating AC power from a DC source supplying an input voltage, comprising:
   input means for inputting the input voltage from the DC source;
   output means for outputting a device output voltage from said device;
   switching circuit means for automatically switching the input voltage;
   output filter means for filtering the device output voltage to a desired AC output voltage level;
   control circuit means for controlling the switching circuit means, comprising:

read only memory means, having an output, for storing switching control data;

means for repeatedly turning on and off said switching circuit means based upon the switching control data; and NAND gate means for modulating the output of said read only memory means; and auxiliary power supply means for generating auxiliary DC power from the DC source to supply power to said control circuit means.

* * * * *